US009052202B2

(12) United States Patent
Riley (10) Patent No.: US 9,052,202 B2
(45) Date of Patent: Jun. 9, 2015

(54) USE OF INERTIAL SENSOR DATA TO IMPROVE MOBILE STATION POSITIONING

(75) Inventor: Wyatt Thomas Riley, Chesterbrook, PA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 12/813,340

(22) Filed: Jun. 10, 2010

(65) Prior Publication Data

US 2011/0307173 A1 Dec. 15, 2011

(51) Int. Cl.
*G01C 21/12* (2006.01)
*G01C 21/16* (2006.01)

(52) U.S. Cl.
CPC .................................. *G01C 21/165* (2013.01)

(58) Field of Classification Search
CPC ............. G01C 21/16; G06G 7/78; G06N 7/00
USPC ................... 701/220, 22, 472, 473, 466, 408
See application file for complete search history.

(56) References Cited

U.S. PATENT DOCUMENTS

| | | | | |
|---|---|---|---|---|
| 4,903,212 A * | 2/1990 | Yokouchi et al. | ............. | 701/454 |
| 6,205,401 B1 * | 3/2001 | Pickhard et al. | ............. | 701/480 |
| 6,249,246 B1 * | 6/2001 | Bode et al. | ............... | 342/357.31 |
| 6,522,266 B1 * | 2/2003 | Soehren et al. | ............... | 340/988 |
| 2004/0199300 A1 * | 10/2004 | Gustafsson et al. | ............. | 701/1 |
| 2007/0205941 A1 | 9/2007 | Riley et al. | | |
| 2008/0040023 A1 * | 2/2008 | Breed et al. | .................... | 701/117 |
| 2008/0071476 A1 | 3/2008 | Hoshizaki | | |
| 2010/0121573 A1 | 5/2010 | Imafuku et al. | | |

FOREIGN PATENT DOCUMENTS

| | | |
|---|---|---|
| EP | 1903306 A2 | 3/2008 |
| JP | 2008076389 A | 4/2008 |
| JP | 2010117147 A | 5/2010 |

OTHER PUBLICATIONS

International Search Report and Written Opinion—PCT/US2011/040096, International Search Authority—European Patent Office—Sep. 28, 2011.

* cited by examiner

*Primary Examiner* — Behrang Badii
*Assistant Examiner* — Daniel L Greene
(74) *Attorney, Agent, or Firm* — Shyam K. Parekh; Michael R. Johnson (57) ABSTRACT

An implementation of a system and method for using inertial sensor data to improve mobile station positioning is provided. Many mobile devices include an inertial sensor. These inertia measurements typically produce low resolution inertial measurements, which may be used to generate an uncertainty value and/or to select a positioning filter model. In some examples, this uncertainty value is used as a process noise input signal into a Kalman filter or similar filter. In some examples, one position estimate is selected from multiple navigation position filter models operating concurrently, each computing a separate position estimate. In these examples, a position estimate is selected based on either the uncertainty value or based on another characteristic of the inertia measurements.

33 Claims, 11 Drawing Sheets

USE OF INERTIAL SENSOR DATA TO IMPROVE MOBILE STATION POSITIONING

CROSS-REFERENCE TO RELATED APPLICATIONS

Not applicable.

BACKGROUND OF THE INVENTION

1. Field of the Invention

This disclosure relates to positioning systems and, more particularly, to the computation of position solutions for mobile receivers.

2. Background of the Invention

The Global Positioning System (GPS) is a satellite navigation system, or satellite positioning system, designed to provide position, velocity and time information almost anywhere in the world. GPS was developed by the Unites States Department of Defense, and currently includes a constellation of twenty-four operational satellites. Other types of satellite navigation systems include the Wide Area Augmentation System (WAAS), the Global Navigation Satellite System (GLONASS) deployed by the Russian Federation, and the Galileo system planned by the European Union. As used herein, "satellite positioning system" (SPS) will be understood to refer to GPS, Galileo, GLONASS, NAVSTAR, GNSS, a system that uses satellites from a combination of these systems, pseudolite systems, or any SPS developed in the future. A pseudolite system (from pseudo-satellite) refers to a non-satellite system that performs or appears as an SPS satellite system, such as by using ground-based transmitter to create GPS signals.

A variety of receivers have been designed to decode the signals transmitted from the satellites to determine position, velocity or time. In general, to decipher the signals and compute a final position, a receiver must acquire signals from satellites in view, measure and track the received signals, and recover navigational data from the signals. By accurately measuring the distance from three different satellites, the receiver triangulates its position (i.e., solves for a latitude, longitude and altitude). In particular, the receiver computes distances to satellites by measuring the time required for each signal to travel from the respective satellite to the receiver. This computation requires precise time information. For this reason, measurements from a fourth satellite help to resolve time and measurement errors (e.g., errors created by inaccuracies of timing circuits within the receiver).

In certain locations (e.g., urban environments with tall buildings), a receiver may be able to acquire signals from only three or fewer satellites. In these situations, the receiver will be unable to resolve all four variables of the position solution: latitude, longitude, altitude and time. If the receiver is able to acquire signals from only three satellites, the receiver may forego an altitude calculation to resolve latitude, longitude and time. Alternately, if altitude is obtained via an alternate means, all four variables may be resolved from three satellite signals. If fewer than three signals are available, the receiver may be unable to calculate its position.

To address this limitation, some receivers employ a hybrid location technology. These hybrid receivers utilize signals from both the base stations and available signals from GPS satellites to resolve the position and time variables. As with satellite signals, a hybrid-location receiver measures the time delay of a wireless signal from a base station in order to compute a distance to that base station. This hybrid-location technique often allows a receiver to compute a position solution in a wide variety of locations where conventional positioning techniques using only satellite signals would otherwise fail. In code division multiple access (CDMA) mobile wireless systems, for example, this hybrid technique of measuring time delays and computing distances to both base stations and satellites is referred to as Advanced Forward Link Trilateration (AFLT).

Clock precision and accuracy within a receiver affects the resulting accuracy of a location solution. In synchronized systems, such as existing CDMA systems, the timing information communicated by a cellular base stations is synchronized with the timing information from the GPS satellites, which allows precise time to be available throughout the system. In some systems, such as the Global System for Mobile Communications (GSM) cellular system, timing information is not synchronized between the base stations and the GPS satellites. In these systems, Location Measurement Units (LMUs) are added to the existing infrastructure to provide precise timing information for the wireless network.

To determine a current position of a mobile station, motion of the mobile station may be modeled (using, for example, past positional measurements) in order to estimate the current velocity (or a range of potential velocities) of the mobile station. Map information, which places the mobile station on a street or highway, which is oriented in a known direction, may also be used to model the current velocity of the mobile station. Filtering methods can further enhance this trajectory estimation technique. A Kalman filter is one filtering method that adaptively tracks the mobile station's trajectory to predict its dynamic state in terms of speed and position. The Kalman filter recursively finds solutions for a least-squares problem and may be used to estimation of past, present, and even future positions. A Kalman filter, extended Kalman filter, or other least-mean-square filter is also useful when a model of user movement is uncertain.

Some position determining systems use a positioning filter, such as a Kalman filter, For example, U.S. Publ. No. 2007/0205941 (published Sep. 6, 2008 and titled "Method for position determination with measurement stitching" to Riley, which is incorporated by reference herein) describes determining a position estimate of a mobile communication device based on an updated positioning filter.

A Kalman filter (KF) is an optimal recursive data estimation algorithm. It is frequently used to model attributes of moving entities such as aircraft, people, vehicles, etc. These attributes can include acceleration, velocity and/or position. The positioning filter algorithm uses a current state of the system and a current measurement to estimate a new state of the system. In practice, a Kalman filter combines all available measurement data and prior knowledge about the system, measuring devices, and error statistics to produce an estimate of the desired variables in such a manner that the error is statistically minimized.

In some positioning algorithms, a mobile station determines its position by modeling an expected motion of the mobile station. A positioning filter, such as a Kalman filter, may assume a movement parameter as constant. For example, the movement parameter may set the user velocity, user speed or user turn radius to a constant value. These models may allow deviation from an expected motion model. In the case of a Kalman filter, the expected amount of deviation from the expected motion model is enabled via process noise. Similarly, position domain filters may have some estimated change of user velocity as well. Unfortunately, the choice of how much variation from the expected user motion model to use, and even what user motion model to use often must be made well in advance, and without any external knowledge of the actual user motion, aside from the GPS measurements themselves. This leaves the models somewhat conservative and sub-optimal.

Accordingly, a need remains to improve the position determining capabilities of mobile communications devices and to do so in a timely and efficient way.

SUMMARY

Some embodiments of the present invention provide for a mobile station comprising: an inertial sensor, wherein the inertial sensor provides inertia measurements; inertia measurement processor coupled to the inertial sensor to accept the inertia measurements and to determine an uncertainty based on the inertia measurements; and navigation position filter coupled to the inertia measurement processor to receive the uncertainty and to determine a position estimate based on the uncertainty, wherein the navigation position filter comprises a first position filter model to compute a first position estimate base on the uncertainty.

Some embodiments of the present invention provide for a method to produce a position of a mobile station, the method comprising: measuring inertia using an inertial sensor to provide inertia measurements; determining an uncertainty based on the inertia measurements; and computing a first position estimate base on the uncertainty using a first position filter model.

Some embodiments of the present invention provide for a mobile station comprising: a means for measuring inertia using an inertial sensor to provide inertia measurements; a means for determining an uncertainty based on the inertia measurements; and a means for computing a first position estimate base on the uncertainty using a first position filter model.

Some embodiments of the present invention provide for a mobile station comprising a processor and memory wherein the memory includes software instructions to: measure inertia using an inertial sensor to provide inertia measurements; determine an uncertainty based on the inertia measurements; and compute a first position estimate base on the uncertainty using a first position filter model.

Some embodiments of the present invention provide for a computer-readable medium including program code stored thereon, comprising program code to: measure inertia using an inertial sensor to provide inertia measurements; determine an uncertainty based on the inertia measurements; and compute a first position estimate base on the uncertainty using a first position filter model.

Some embodiments of the present invention provide for a mobile station comprising: an inertial sensor, wherein the inertial sensor provides inertia measurements; inertia measurement processor coupled to the inertial sensor to accept the inertia measurements and to determine an uncertainty based on the inertia measurements; navigation position filter coupled to the inertia measurement processor to receive the uncertainty and to determine a position estimate based on the uncertainty, wherein the navigation position filter comprises a first position filter model to compute a first position estimate base on the uncertainty and a second position filter model to compute a second position estimate base on the uncertainty; and switch comprising a first input port for the first position estimate, a second input port for the second position estimate, a control input port coupled to a characteristic of the inertia measurements, and an output port selectable by the control input port.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

Some navigation positioning methods use a single model to determine a position of a mobile station. The model uses a history of past motion as well as an assumption of what type of motion is expected. Unfortunately, such assumptions inaccurately model a typical mobile station undergoing real-life movement. During one duration, the mobile station may be with a user walking while during another duration, the mobile station may be with a user traveling on a highway.

Some models combine GPS position tracking with inertial navigation systems (INS) tracking. In a GPS/INS system, an INS position estimate is computed based on inertial measurements from inertial sensors such as from accelerometers and/or gyrometers. Because of drift inherent with inertial sensors, inertial sensors can only provide an accurate solution for a short period of time. When available, a GPS position fix may be used to re-calibrate these inertial sensors.

Existing GPS/INS system, such as in fighter aircraft, use highly accurate and expensive inertial sensors. Unfortunately, the quality of inexpensive inertial sensor parts (e.g., those readily available on mobile stations for camera image stabilization or for gaming purposes such as MEMS accelerometers and MEMS gyrometers) offer poor quality inadequate for use in traditional GPS/INS systems.

Embodiments of the present invention use lower quality inertial sensors, such as MEMS devices, to estimate a quantity or characteristic of motion the mobile station is experiencing. The quantity of motion measurement indicates which user motion model to select, and may also be used to set an uncertainty (e.g., variation or process noise) to be used as an input parameter for the selected model. The uncertainty value may represent an uncertainty of a user's movement intentions and/or an uncertainty in the model. By using inertial measurements to select a model and/or using inertial measurements to set an uncertainty input parameter, the model may more accurately determine a user's position. The model may be represented by a navigation position filter, such as a Kalman filter.

Figure 1A:
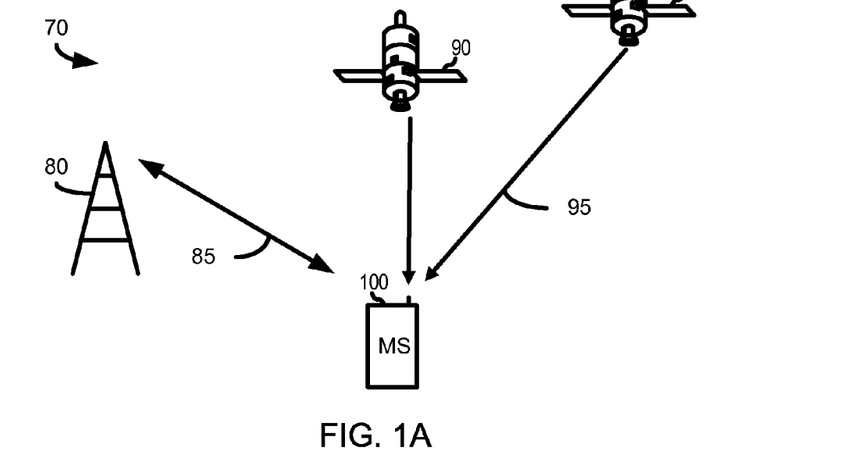
FIG. 1 shows a mobile station (MS) 100 receiving signals from two positioning satellites 90.

FIG. 1 shows a mobile station (MS) 100 receiving signals from two positioning satellites 90. A mobile station 100 may take the form of any one of a variety of mobile receivers capable of receiving navigation signals (e.g., satellite navigation signals 95 or wireless communication signals 85) from reference stations such as satellite vehicles 90 and/or from base stations 80, for computing a position solution. A mobile station 100 may also be called a mobile station, a mobile unit, a mobile phone, a handheld navigation receiver, a receiver mounted within a vehicle, such as an airplane, automobile, truck, tank, ship, and the like. A base station 80 may communicate with a mobile station 100 via any one of a number of wireless communication protocols in a synchronous environment. One common wireless communication protocol is code division multiple access (CDMA) in which multiple communications are simultaneously conducted over a radio-frequency (RF) spectrum. In a CDMA environment, the techniques may be viewed as a mechanism for enhanced Advanced Forward Link Trilateration (AFLT). Other examples include Global System for Mobile Communications (GSM), which uses narrowband time-division multiple access (TDMA) for communicating data, and General Packet Radio Service (GPRS). In some embodiments, a mobile station 100 may integrate together a GPS receiver and a wireless communication device for voice or data communication. Thus, although the specific example of a GPS system may be described within this document, the principles and techniques of the present invention are applicable to any satellite positioning system or terrestrial positioning system such as a wireless network.

A mobile station 100 employs techniques to compute a positioning solution based on satellite signals 95 and wireless communication signals 85 received from satellites 90 and base stations 80, respectively. A mobile station 100 acquires signals 95 from satellites 90 in view, and measures distance from each satellite by measuring the time required for each signal to travel from the respective satellite to the mobile station 100 in order to determine pseudo-ranging measurement. Similarly, the mobile station 100 may also receive signals 85 from base stations 80 of wireless communication system 70, and measures distances from base stations 80 based on the time required for each wireless signal to travel from the base stations to the mobile station 100. The mobile station 100 typically resolves position and time variables based on these measurements.

Figure 1B:
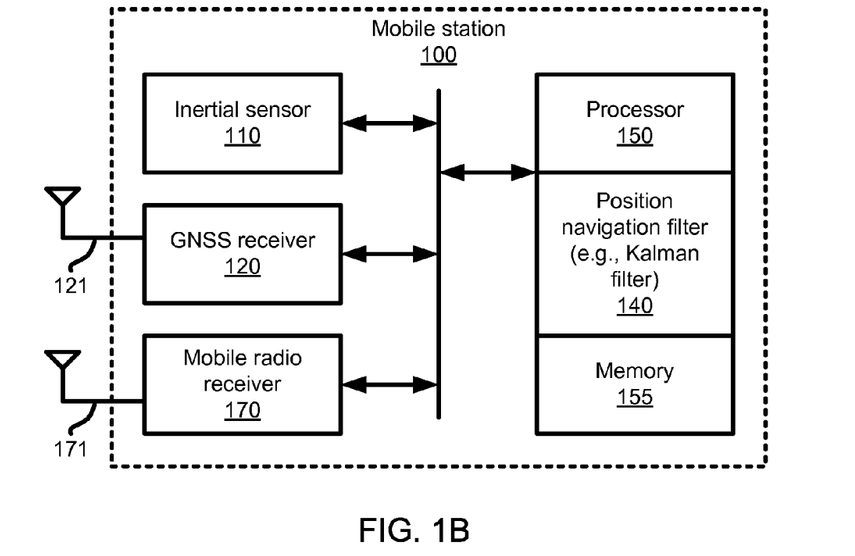

FIG. 1B depicts a block diagram of portions of a mobile communications device (mobile station 100), in accordance with the principles of the invention. As shown, the mobile station 100 includes an antenna 121 configured to receive signals from a satellite navigation system or satellite positioning system. The mobile station 100 also includes an antenna 171 configured to receive signals from a terrestrial communications network. These signals are received by respective receivers (GNSS receiver 120 and mobile radio receiver 170) and provided as input measurements to a processor 150. The processor 150 includes both software and hardware components to provide signal processing functionality with respect to the signals.

Of particular interest, a position navigation filter 140 (e.g., a Kalman filter), associated with or as part of the processor 150, assists with the position determining functions of the mobile station 100. A positioning navigation filter 140 receives input measurements and implements an algorithm for estimating desired variables based on the input measurements and the historical state of the system. A memory 155 is often utilized to store state estimates and covariance matrix values for the Kalman filter. The covariance matrix values provide a measure of error, or certainty, of the state estimates provided by the Kalman filter.

The mobile station 100 may be, for example, a cellular telephone or similar mobile communications device. Accordingly, there are additional functional blocks and devices which are part of the mobile station 100 that are not depicted in FIG. 1B. These additional blocks and/or devices typically relate to: (1) processing signals received from the antennas 171 and 212; (2) providing a user interface; (3) providing speech communications; and (4) providing data communications and other similar capabilities. Many of these functional blocks and devices are not directly related to position determination and, therefore, are not included so as not to obscure the principles of the present invention.

Signals 95 are typically received from satellite vehicles 90 via the antenna 121. These signals 95 are then decoded and processed into position information using well known algorithms and techniques. In the past, signals 95 from at least three satellite vehicles were required during a single measurement epoch in order to generate a position fix, using a weighted least squares (WLS) model, that could be used to initialize a Kalman filter. Once the Kalman filter is initialized, then the Kalman filter continues producing position estimates based on later occurring GPS measurements.

Figure 2:
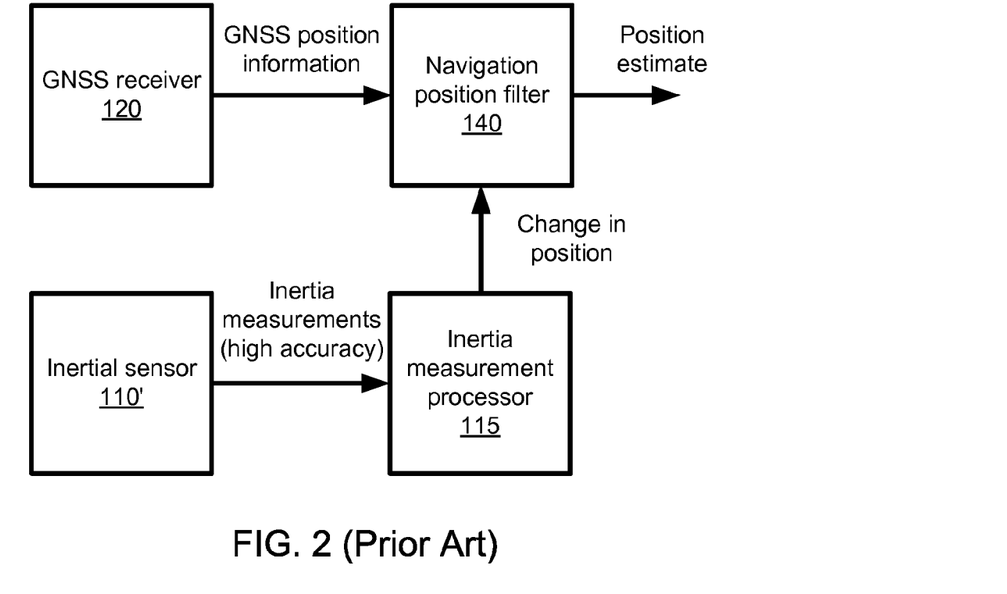
FIG. 2 shows a block diagram of a mobile station including a GNSS receiver and an inertial sensor to determine a change in position.

FIG. 2 shows a block diagram of a mobile station including a GNSS receiver and an inertial sensor to determine a change in position. The mobile station 100 includes a high accuracy inertial sensor 110', an inertial measurement processor 115, a GNSS receiver 120 and a navigation position filter 140. A high accuracy inertial sensor 110' provides accurate 3-dimensional (3-D) inertia measurements at 4 bits or greater for each dimension. A position estimate may be based on signals from the GNSS receiver 120 and the inertial sensor 110'. When satellite signals 95 are available, the GNSS receiver 120 provides GNSS position information to the navigation position filter 140. The inertial sensor 110' provides inertia measurement to the inertial measurement processor 115. The inertial measurement processor 115 integrates the inertia measurement to determine a change in position, which is provided to the navigation position filter 140. When sufficient satellite signals 95 are available from the GNSS receiver 120, the navigation position filter 140 may use just GNSS position information or may weight GNSS position information higher than inertia measurements when determining a position estimate. When satellite signals 95 are insufficient or unavailable, the navigation position filter 140 may use only the change in position information determined by the inertial measurement processor 115 based on the inertia measurements from the inertial sensor 110'.

For useful position changes estimates from the inertial measurement processor 115, the inertial sensor 110' must provide high accuracy and high quality inertia measurements. Unfortunately, many mobile devices do not have high accuracy inertial sensors. In such a device with a low accuracy inertial sensor, an inertial measurement processor 115 is unable to integrate and produce useful change in position values. Thus, mobile devices having low accuracy sensors may not be used to implement the structure shown in FIG. 2.

Inertial sensor data (e.g. from inexpensive parts already on a mobile station for use in camera image stabilization and gaming) may be monitored to determine how measurements vary. If outputs are very stable, it is reasonable to assume that the user is either static, or is moving very smoothly, and so the amount of process noise added can be safely chosen to be a much smaller than normal amount. As the outputs from inertial sensors begins to vary more, the mobile station is more likely to be in motion and/or accelerating off a simple straight-line path, so the positioning calculations should exit static mode, and use more and more process noise, to allow for the possibly higher changes in user acceleration. During an initial warm-up period, the GNSS position information is not available yet. By varying the process noise in a navigation position filter based on the amount of user motion, tracking could be much smoother than it is today during static or smooth driving conditions.

Figure 3:
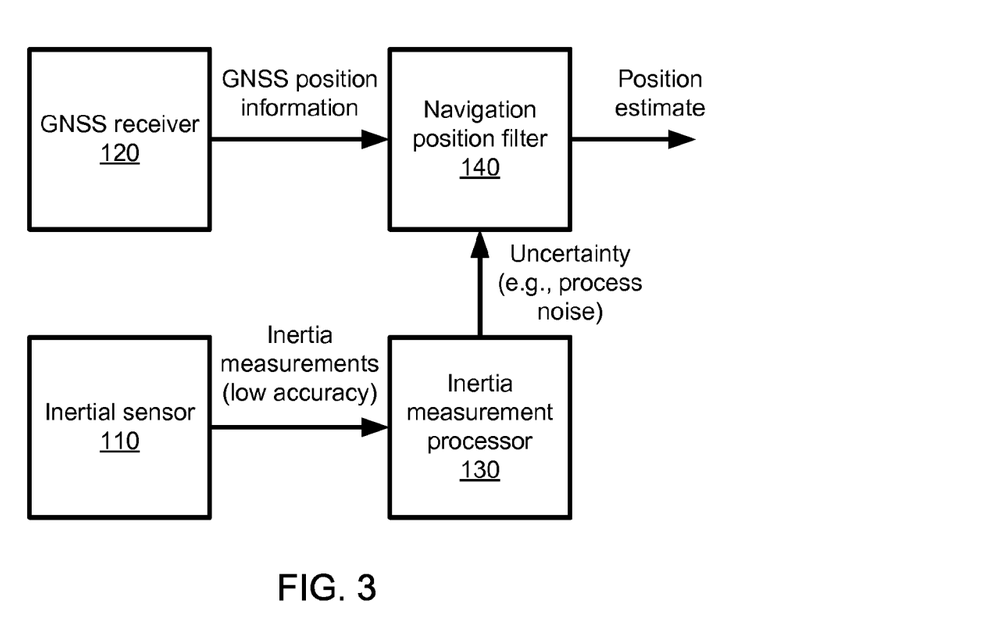
FIGS. 3 and 4 each show a block diagram of a mobile station including a GNSS receiver and an inertial sensor to determine an uncertainty, in accordance with embodiments of the present invention.
Figure 4:
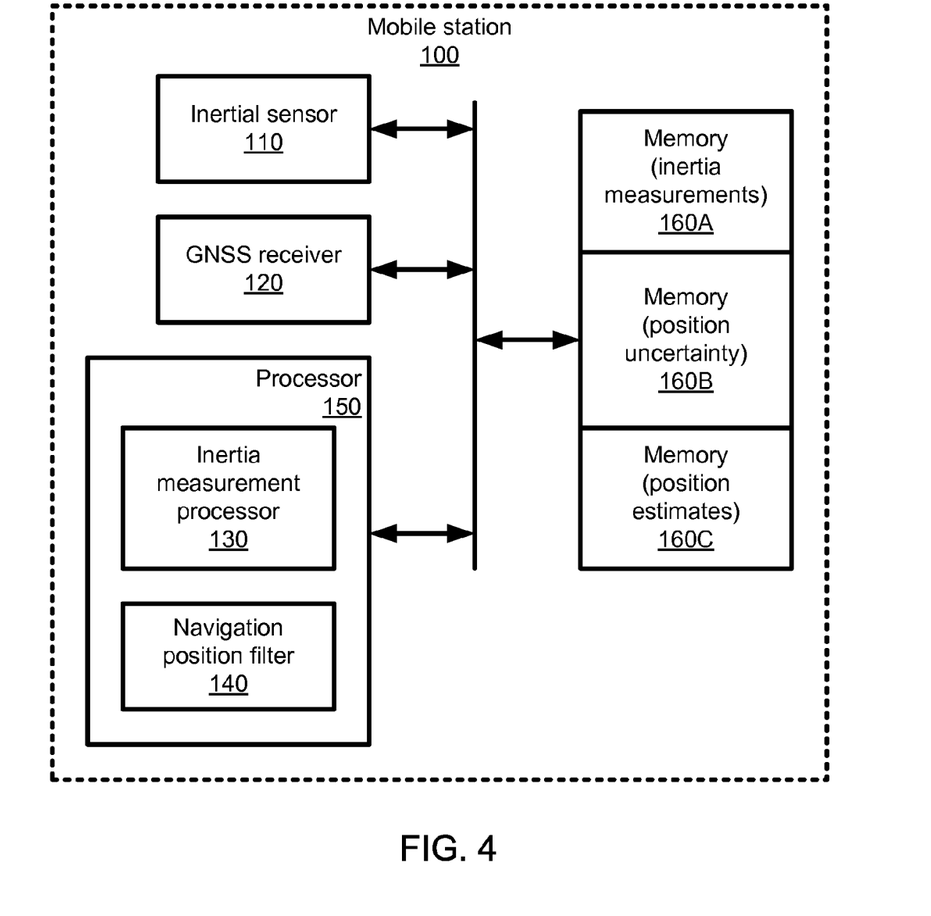

FIGS. 3 and 4 each show a block diagram of a mobile station including a GNSS receiver and an inertial sensor to determine an uncertainty, in accordance with embodiments of the present invention.

In FIG. 3, the mobile station 100 includes a low accuracy inertial sensor 110 rather than a high accuracy inertial sensor 110'. The inertial sensor 110 acts as a means for measuring inertia and to providing inertia measurements. The mobile station 100 also includes an inertial measurement processor 130, a GNSS receiver 120 and a navigation position filter 140. The inertial measurement processor 130 and the navigation position filter 140 may be software routines executing on a processor 150. These routines may be stored on a computer-readable medium as program code. Furthermore, the inertial measurement processor 130 acts as a means for determining an uncertainty based on the inertia measurements and the navigation position filter 140 acts as a means for computing a first position estimate base on the uncertainty. If the inertia measurements indicate a great change in acceleration, then the mobile device 100 is moving, accelerating and/or decelerating, therefore the process noise is set to a higher value. On the other hand, if the inertia measurements indicate no or low acceleration (when gravity is removed), then the mobile device 100 is either moving in a straight line or not moving, therefore, the process noise is set to a lower value.

A position estimate may be based on signals from the GNSS receiver 120 and the inertial sensor 110. The inertial sensor 110 is relatively inexpensive and unable to provide accurate 3-dimensional (3-D) inertia measurements. Instead, the inertial sensor 110 provides coarse 1-D, 2-D or 3-D inertia measurements. For each dimension, the sensor provides coarse measurements at 1, 2 or 3 bits of accuracy. A 1-bit inertia measurement indicates one of two levels of motion: either motion or no-motion. A 2-bit inertia measurement indicates one of three levels of motion or no-motion. A 3-bit inertia measurement indicates one of seven levels of motion or no-motion. Each level of motion in each dimension, a first bit (of a one-, two- or three-bit sensor) may be use to indicate a direction of movement and any remaining bits may indicate a magnitude of movement.

The inertial sensor 110 sends low accuracy inertia measurements to the inertial measurement processor 130. Instead of integrating the inertia measurements and generating a change in position, the inertial measurement processor 115 determines a position uncertainty parameter (referred to as process noise) based on the inertia measurements. For example, the inertial measurement processor 115 may translate single dimension 2-bit inertia measurements (e.g., "00" represents no movement, "01" represents low inertia or light movement, "10" represents medium inertia or a medium level of movement, and "11" represents high inertia or high movement) into four levels of uncertainty (no uncertainty, low uncertainty, medium uncertainty and high uncertainty). Alternatively, the inertial measurement processor 130 may accept more bits of inertia measurements (e.g., additional dimensions or additional bits per dimension) and may quantize these measurements into a two, three or four levels of discrete uncertainty values. The inertial measurement processor 130 may reduce an uncertainty value when only gravity's constant acceleration is detected and increase the uncertainty value when acceleration varies. Based on GNSS position information (if available) and the uncertainty value, the navigation position filter 140 computes a position estimate. As such, inertia measurements from the inertial sensors are not integrated to compute a change in position but rather used to set an uncertainty value or process noise.

When sufficient satellite signals 95 are available from the GNSS receiver 120, the navigation position filter 140 may use just GNSS position information or may weight GNSS position information higher than inertia measurements when determining a position estimate. When satellite signals 95 are insufficient or unavailable, the navigation position filter 140 may use the uncertainty level to estimate or predict a change in position or a next position.

In FIG. 4, a mobile station 100 is shown in more detail. The mobile station 100 includes a bus and interfaces among an inertial sensor 110, a GNSS receiver 120, a processor 150 and memory 160. The inertial sensor 110 may be coupled to a common bus or coupled to a dedicated port on the processor 150. Similarly, the GNSS receiver 120 may also be coupled to the common bus or coupled to a dedicated port on the processor 150. The processor 150 includes a first module (an inertia measurement processor 130) and a second module (a navigation position filter 140) each which may be software executing on the processor 150. The memory 160 includes stored values including inertia measurements 160A, a position uncertainty value 160B and one or more position estimates 160C.

Figure 5A:
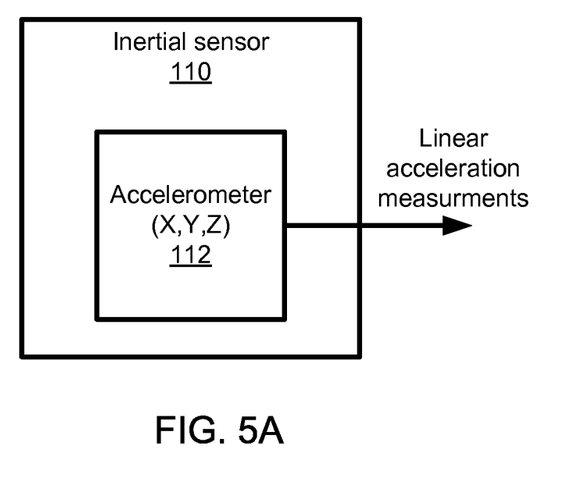
FIGS. 5A-D show various forms of an inertial sensor, in accordance with embodiments of the present invention.
Figure 5B:
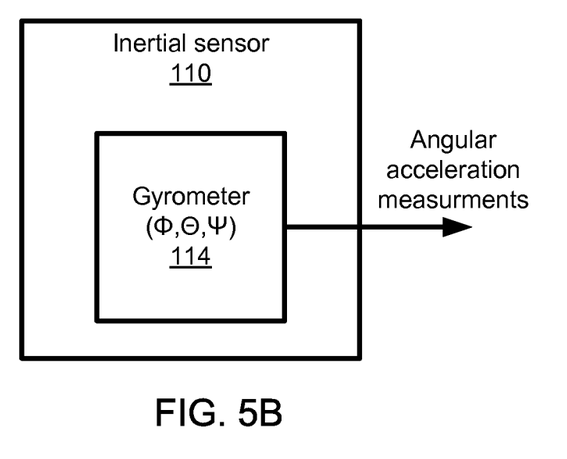
Figure 5C:
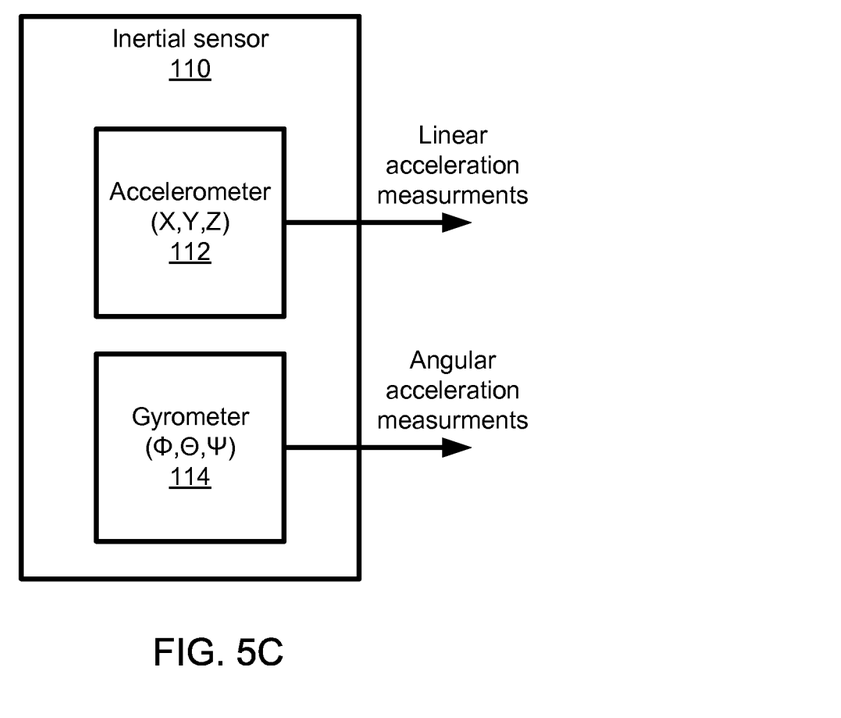
Figure 5D:
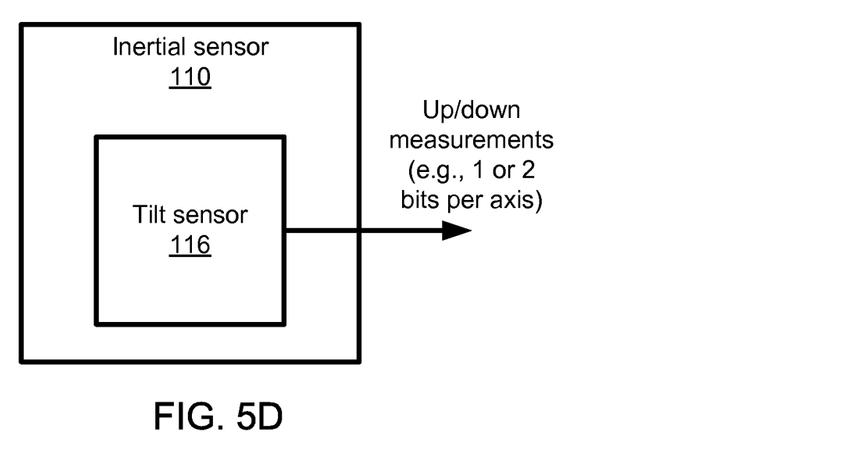

FIGS. 5A-D show various forms of an inertial sensor, in accordance with embodiments of the present invention. In FIG. 5A, the inertial sensor 110 includes a 3-D accelerometer 112 providing 3-dimensional (3-D) linear acceleration measurements in an (X,Y,Z) coordinate system relative to a mobile station reference system. In FIG. 5B, inertial sensor 110 includes a 3-D gyrometer 114 providing 3-D angular acceleration measurements in a $(\Phi,\Theta,\Psi)$ coordinate system relative to a mobile station reference system, where $\Phi$ indicates roll or bank, Θ indicates pitch or elevation, and Ψ indicates yaw or heading relative to north. In FIG. 5C, the inertial sensor 110 includes both a 3-D accelerometer 112 providing 3-D linear acceleration measurements and a 3-D gyrometer 114 providing 3-D angular acceleration measurements. In FIG. 5D, the inertial sensor 110 includes a tilt sensor 160. The tilt sensor 116 provides 1 or 2 bits of tilt information per axis. For example, a tilt sensor 116 may provide a single bit measurement value indicating if the mobile device 100 is generally facing upwards or downwards. Some inertial sensors 110 provide one or more of linear acceleration measurements, angular acceleration measurements and tilt sensor measurements. Each of the measurements above provides a minimum of 1 bit along at least one axis but may provide 1, 2 or 3 bits of information for 1, 2 or 3 dimensions.

Figure 6A:
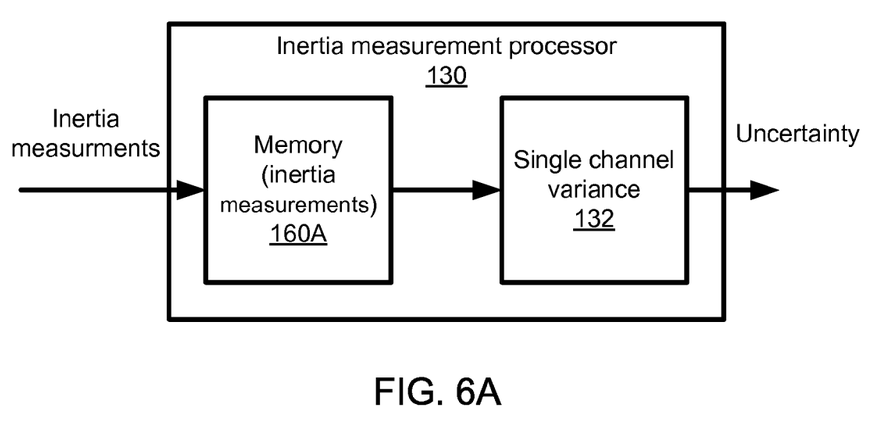
FIGS. 6A-D show various forms of an inertial measurement processor, in accordance with embodiments of the present invention.

FIGS. 6A-D show various forms of an inertial measurement processor, in accordance with embodiments of the present invention. In FIG. 6A, the inertial measurement processor 130 includes memory 160A to buffer inertia measurements and a single channel variance module 132. The single channel variance module 132 uses the buffered inertia measurements to compute an uncertainty value. The single channel variance module 132 determines a variance of the inertia measurements along a single axis. The inertia measurements are treated as a random variable X with an expected value (mean) $\mu=E[X]$. The variance of X is given by $Var(X)=E[(X-\mu)^2]$. In the simplest form, the variance of X is given by $Var(X)=\Sigma(x_i)^2/N$ for N samples $x_0, x_1, \ldots, x_{N-1}$ where $\mu$ is assumed to be zero. Based on the computed variance over a period (e.g., period=N), an uncertainty value is set. The uncertainty may be the computed variance itself or will be directly determined from this computed variance. In some embodiments, the resulting uncertainty value is a linear translation from the computed variance. In other embodiments, the resulting uncertainty value is a quantized value from the computed variance.

Figure 6B:
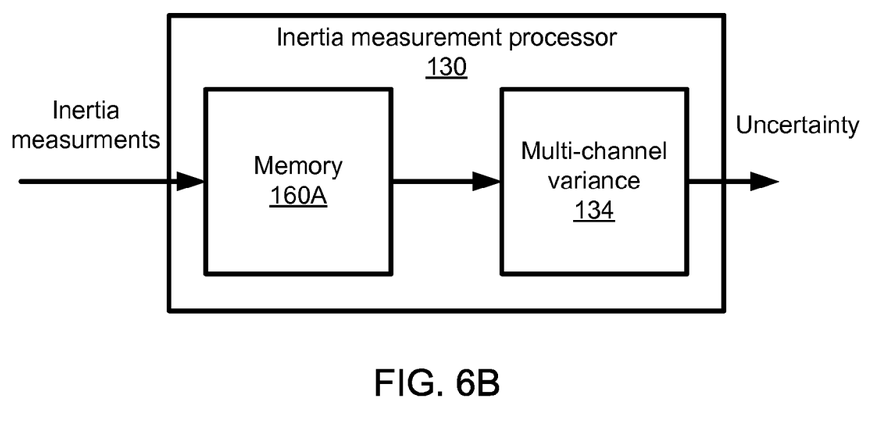

In FIG. 6B, the inertial measurement processor 130 includes memory 160A and a multi-channel variance module 134. The multi-channel variance module 134 determines a variance for each dimension of the inertia measurements. For example, if the inertia measurements provide 3-D accelerometer measurements, the multi-channel variance module 134 computes three single channel variances: $Var(X)$, $Var(Y)$ and $Var(Z)$. The uncertainty is based on the computed variances. For example, the uncertainty value may be equal to the sum of the variances: Uncertainty=$Var(X)+Var(Y)+Var(Z)$. Alternatively, the uncertainty value may be linearly related to the sum of the variances: Uncertainty=$k^*\{Var(X)+Var(Y)+Var(Z)\}$, where k is a predetermined constant. Alternatively, the uncertainty value may be related to a maximum of the variances: Uncertainty=$k^*\{Max[Var(X), Var(Y), Var(Z)]\}$.

Figure 6C:
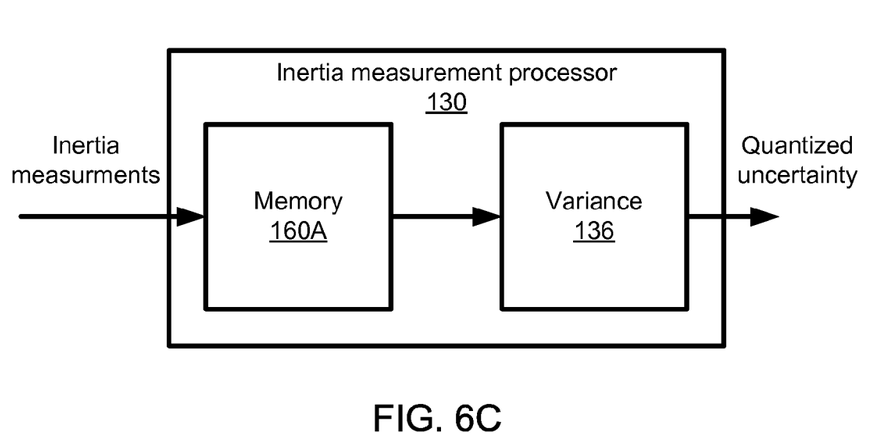

In FIG. 6C, the resulting uncertainty value may be further parsed by quantizing it into two, three or four discrete uncertainty values. The inertial measurement processor 130 includes memory 160A and a variance module 136. The variance module 136 determines a variance along one or more dimensions of the inertia measurements. The resulting one or more variance values are quantized to provide a quantized uncertainty value. When quantizing, the variance module 136 translates discrete ranges of variance values (or combined variance values) into a single uncertainty value representing each discrete range.

Figure 6D:
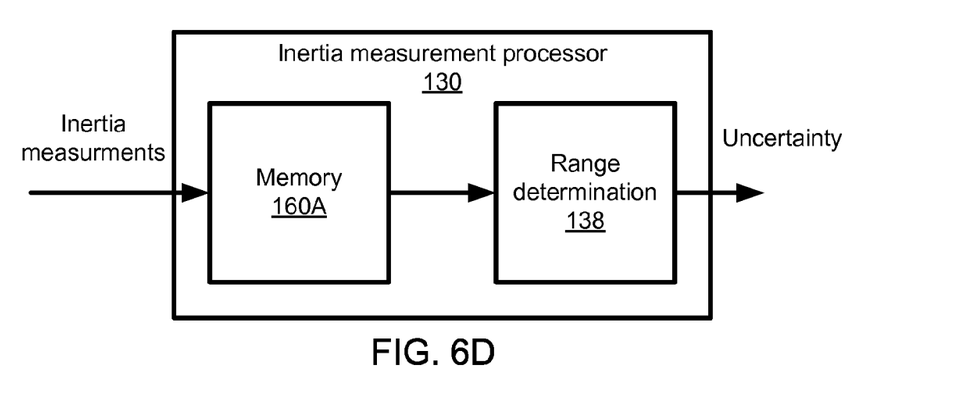

In FIG. 6D, the inertial measurement processor 130 includes memory 160A and a range determination module 138. In a single dimension, the range determination module 138 determines a range of N incoming measurements $\{x_0, x_1, \ldots, x_{N-1}\}$ represented by random variable X. For example, $Range(X)=Max(|x_0|, |x_1|, \ldots, |x_{N-1}|)$. An uncertainty value is set based on the $Range(X)$. For example, Uncertainty=$k^*Range(X)$. Alternatively, the uncertainty value may be a quantized valued based on the $Range(X)$.

Figure 7:
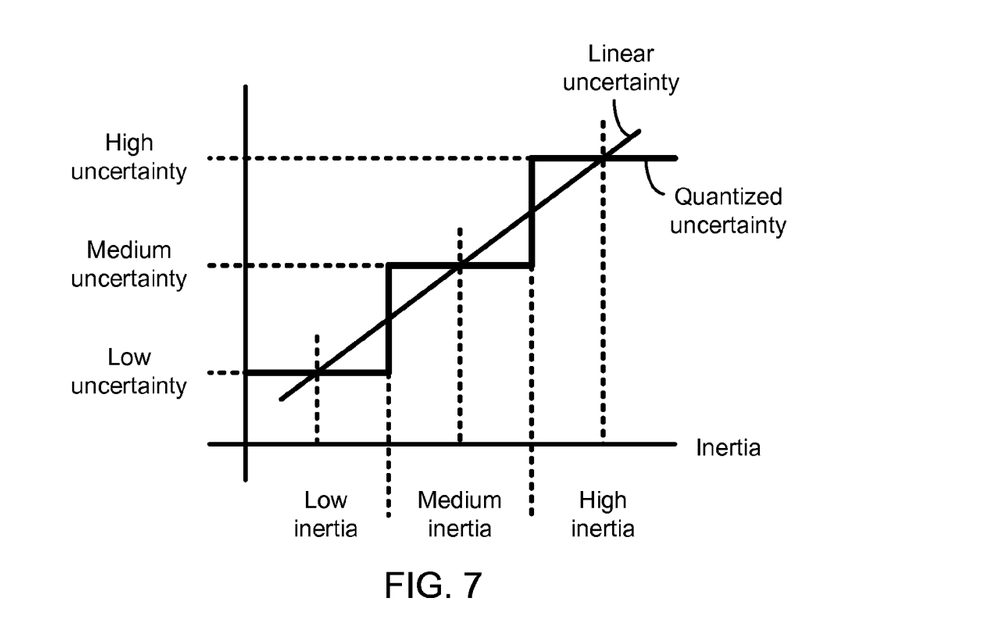
FIG. 7 charts an inertia verses an uncertainty, in accordance with embodiments of the present invention.

FIG. 7 charts an inertia verses an uncertainty, in accordance with embodiments of the present invention. Inertia measurements may be translated from a received value of inertia or a characteristic of the received value (e.g., a variance or sum of variances) to an uncertainty value. In the linear case, an uncertainty value exists for each level of inertia, as shown in the chart by the linear uncertainty line.

In the quantized case, a range of inertia values are translated into a common uncertainty value. The inertia measurements received by the inertial measurement processor 130 are quantized by the inertial measurement processor 130 into two or three values. For example, measurements representing low inertia set a low uncertainty value, measurements representing medium inertia set a medium uncertainty value, and measurements representing high inertia set a high uncertainty value, as shown in the chart by the quantized uncertainty staircase. Alternatively, the inertia measurements are effectively quantized if the inertia measurements represent only one or two bits of data.

Figure 8:
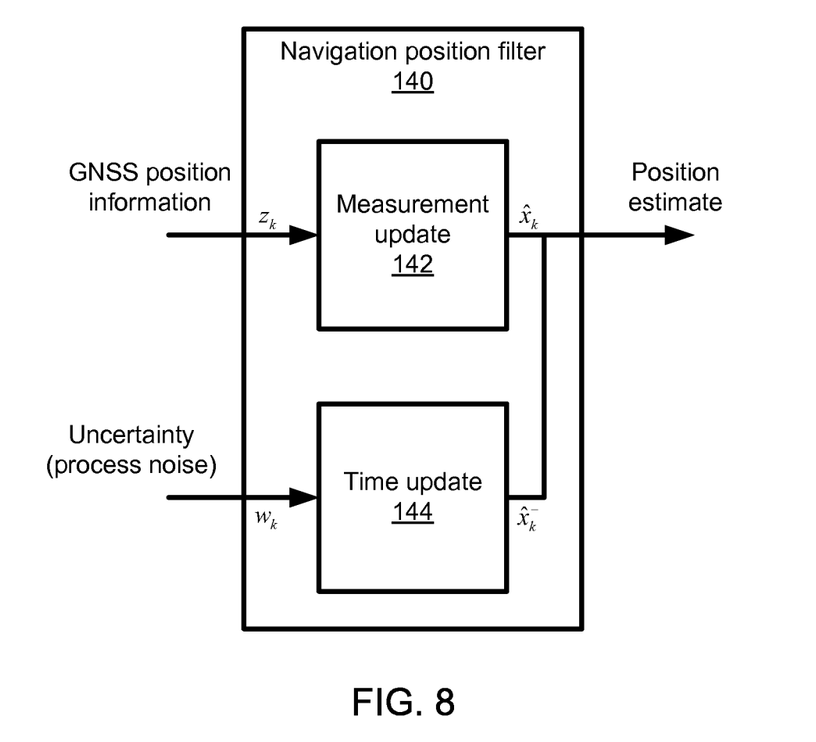
FIG. 8 shows a block diagram of a navigation position filter, in accordance with embodiments of the present invention.

FIG. 8 shows a block diagram of a navigation position filter, in accordance with embodiments of the present invention. The navigation position filter 140 implements a Kalman filter and includes a measurement update module 142 and a time update module 144.

The Kalman filter cycles between a time update period and a measurement update period to find a solution for the linear stochastic deference equation: $x_k=Ax_{k-1}+Bu_{k-1}+w_{k-1}$ with a measurement $z_k=Hx_k+v_k$, where: $w_k$ is assumed to be a zero-mean, white, normally distributed random variable that represents process noise and $p(w)\Box N(0,Q)$ where Q is the process noise covariance matrix; $v_k$ is an uncorrelated zero-mean white, normally distributed random variable that represents measurement noise and $p(v)\Box N(0,R)$ where R is the measurement noise covariance matrix; A is an n×n matrix that relates the previous position at time k−1 to the current position at time k without the influence of a driving function or process noise; $u_k$ is an optional control input; B is an n×1 matrix that relates the optional control input $u_k$ to the current position; and H is an m×n matrix that relates the position to the measurement $z_k$. Typically, there is no control signal $u_k$ (B=0) and matrix A is set based on the model selected.

In the time update module 144 and during the time update period, the Kalman filter predicts a next position $\hat{x}_k$, in part, based on the process noise $w_{k-1}$ (uncertainty) from the previous period. To project the position ahead, the a priori position estimate $\hat{x}_k^-$ at step k is updated using the time update equation: $\hat{x}_k^-=A\hat{x}_{k-1}+Bu_{k-1}$, where $\hat{x}_{k-1}$ is the previous estimated position. To project the error covariance ahead, the a priori estimated error covariance $P_k^-$ is updated using the time update equation: $P_k^-=AP_{k-1}A^T+Q$, where the a priori estimate error covariance is $P_k^-=E[e_k^- e_k^{-T}]$, the a posteriori estimate error covariance is $P_k=E[e_k e_k^T]$, the a priori estimated error is $e_k^-\equiv x_k-\hat{x}_k^-$, and the a posteriori estimated error is $e_k\equiv x_k-\hat{x}_k$.

In the measurement update module 142 and during the measurement update, the Kalman filter corrects parameters based on position measurements. First, the Kalman gain $K_k$ is computed using $K_k=P_k^-H^T(HP_k^-H^T+R)^{-1}$. Second, the estimated position is corrected with the measurement $z_k$ (GNSS position information) using $\hat{x}_k=\hat{x}_k^-+K_k(z_k-H\hat{x}_k^-)$. Third, the a posteriori estimate error covariance is computed using $P_k=(I-K_kH)P_k^-$.

Further insight to Kalman filters may be found in "An Introduction to the Kalman Filter" by Greg Welch and Gary Bishop (Technical Report TR 95-041, Department of Computer Science, University of North Carolina at Chapel Hill, Chapel Hill, N.C. 27599-3175; updated: Friday, May 23, 2003), the contents of which are incorporated by reference in its entirety.

Figure 9:
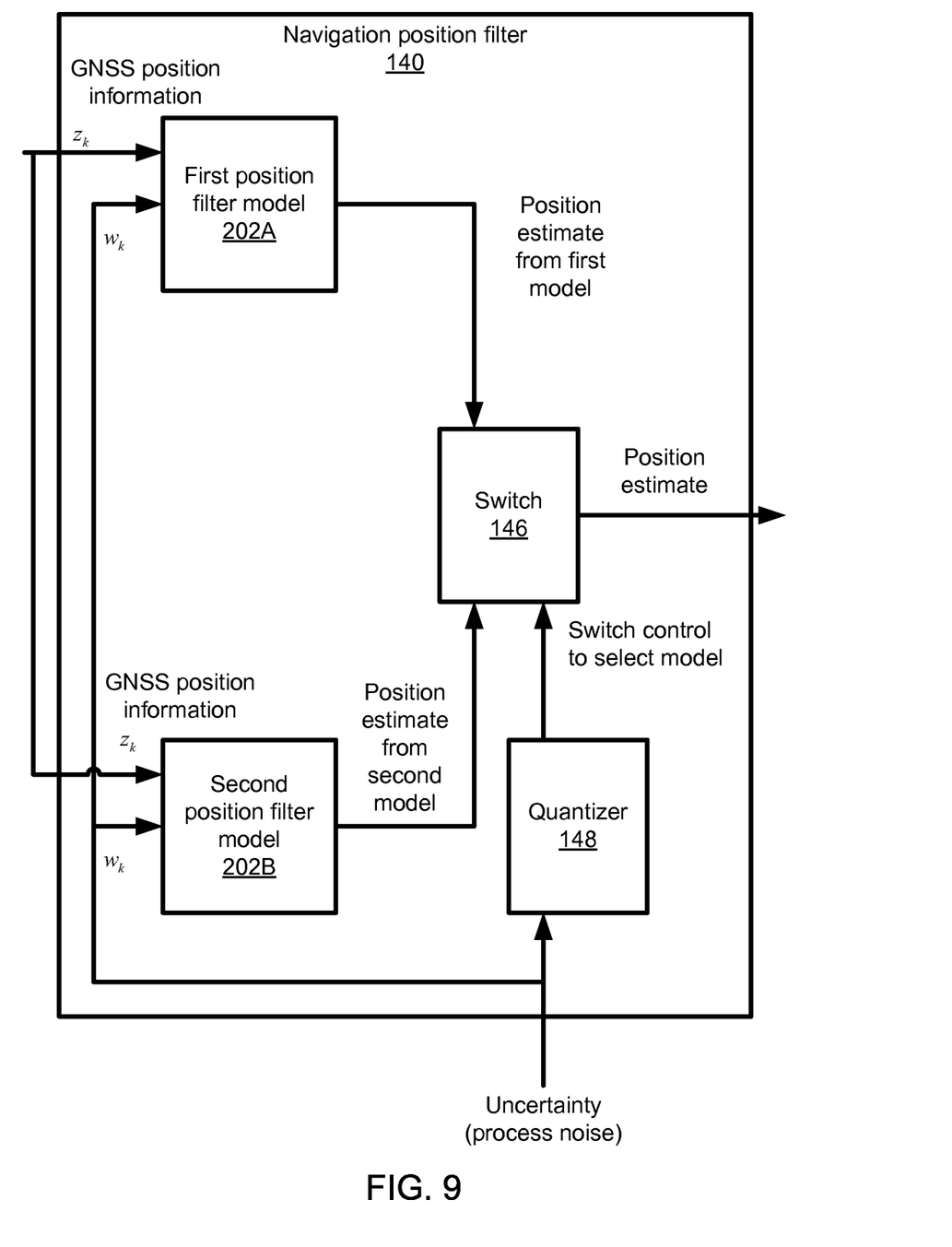
FIGS. 9 and 10 show block diagrams of a various navigation position filters containing multiple models, in accordance with embodiments of the present invention.
Figure 10:
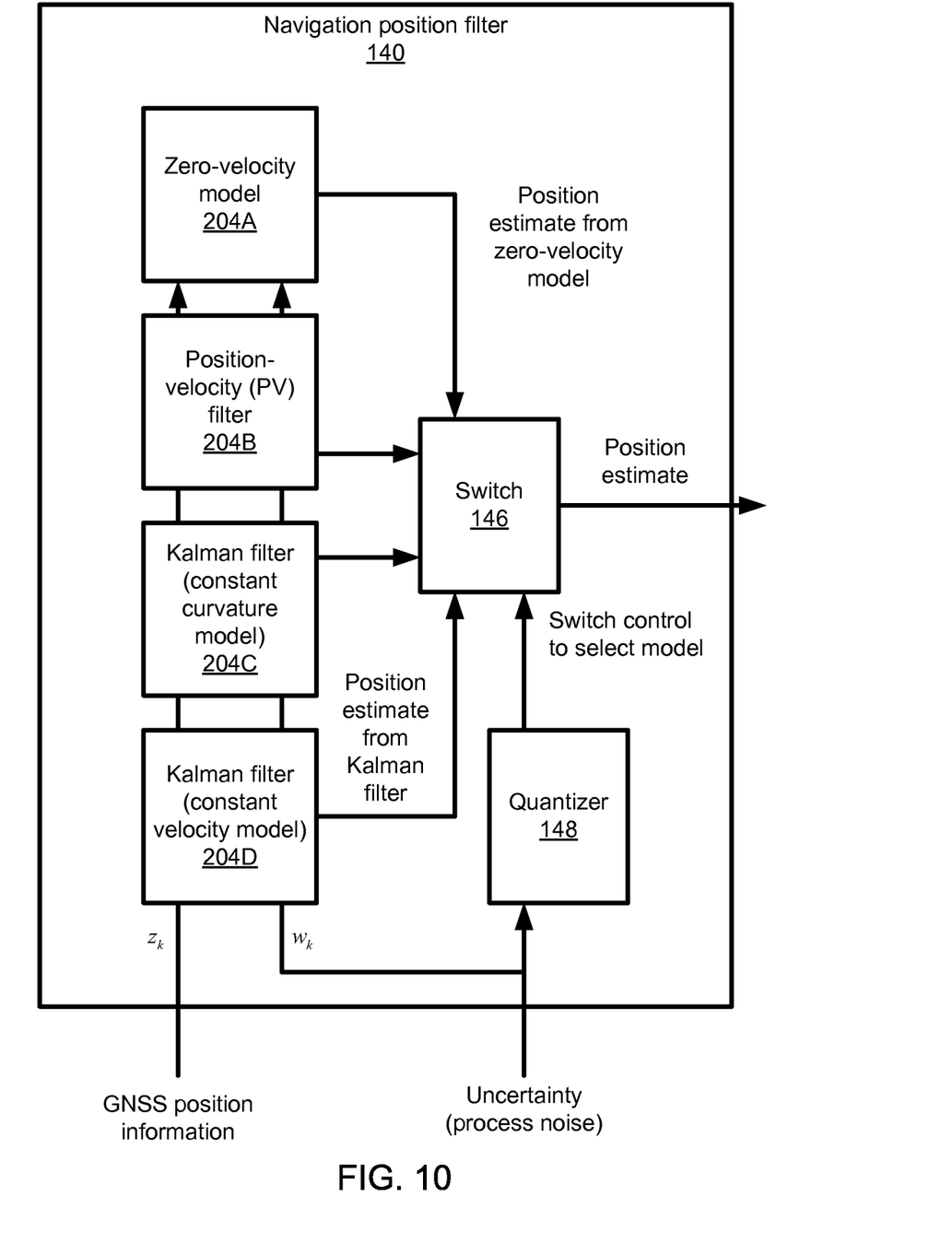

FIGS. 9 and 10 show block diagrams of a various navigation position filters containing multiple models, in accordance with embodiments of the present invention. Each navigation position filter 140 includes multiple models, a switch 146 and a quantizer 148. Each of the models receives GNSS position information (measurement $z_k$) and the uncertainty (process noise $w_k$) and provides a separate position estimate as an input to the switch 146. The switch 146 routes a selected one of the position estimates from one of the multiple models as an output signal best estimating the position of the mobile device 100. The quantizer 148 may control the switch 146 based on the uncertainty or based on measurement data.

In FIG. 9, the navigation position filter includes two models: a first position filter model 202A and a second position filter model 202B. Both the first and second position filter models 202 receive GNSS position information (measurements $z_k$) and the uncertainty (process noise $w_k$). The process noise sets a variation allowed in the model. Allowing for variation (or extra motion) of model, permits the model to deviation more. The uncertainty is also used to determine which position estimate to use. For example, the first position filter model 202A may be more accurate when the uncertainty is low and the second position filter model 202B may be more accurate when the uncertainty is high. The first position filter model 202A may be more accurate when the uncertainty is low and the second position filter model 202B may be include a first order approximation of position based on an assumption that the mobile device 100 is in a car traveling a constant speed and the second position filter model 202B may be include a second order approximation of position based on an assumption that the mobile device 100 is in a car traveling generally at constant speed but also allows for turns, acceleration and deceleration.

In the case with only two models, the quantizer 148 may be a threshold detector. For example, the quantizer 148 may set a switch control based on if the uncertainty is greater or less than a predefined threshold. Both position filter models 202 may receive updated measurement and uncertainty data even though only one of the two is supplying a position estimate at any one time. In this way, iterative state variables are kept current and each position estimate is ready to use.

In FIG. 10, the navigation position filter includes four models: a first position filter model (zero-velocity model 204A); a second position filter model (position-velocity PV filter 204B); a third position filter model (Kalman filter with constant curvature model 204C); and a fourth position filter model (Kalman filter with constant velocity model 204D). Each model 204 is shown receiving both the GNSS position information (measurements $z_k$) and the uncertainty (process noise $w_k$). Of course, if a model does not require an uncertainty value, that module does not need to receive the unused parameter. Based on a characteristic of the uncertainty (e.g., magnitude or variance over time), the navigation position filter 140 uses a particular one of the multiple models 204. For example, if the quantizer 148 receives an uncertainty under a first threshold, the quantizer 148 provides a switch control signal to select the zero-velocity model 204A, if the quantizer 148 receives an uncertainty above the first threshold but less than a second threshold, the quantizer 148 provides a switch control signal to select the PV filter 204B, and so on.

Alternatively, the quantizer 148 receives inertia measurements from the inertial sensor 110 or from the inertia measurement processor 130. If the inertial sensor 110 may include both an accelerometer 112 providing linear acceleration measurements and/or a gyrometer 114 providing angular acceleration measurements. The quantizer 148 examines the measurements to determine which model 204 to select. For example, if all measurements are below a threshold, the zero-velocity model 204A may provide the best position estimate. Therefore, the quantizer 148 will provide a switch control signal to select the position estimate from the zero-velocity model 204A. If the measurements suggest the mobile device 100 is experiencing predominantly acceleration along one axis, then the position estimate from the PV filter 204B may be used. If the measurements indicate the mobile device 100 is experiencing predominantly an angular acceleration, then the position estimate from the constant curvature Kalman filter 204C is used. If the measurements indicate the mobile device 100 is experiencing predominantly a constant velocity, then the position estimate from the constant velocity Kalman filter 204D is used. In this matter as the characteristic of a user's movement changes with time, the most appropriate model is used and a more optimal position estimate is selected.

Figure 11:
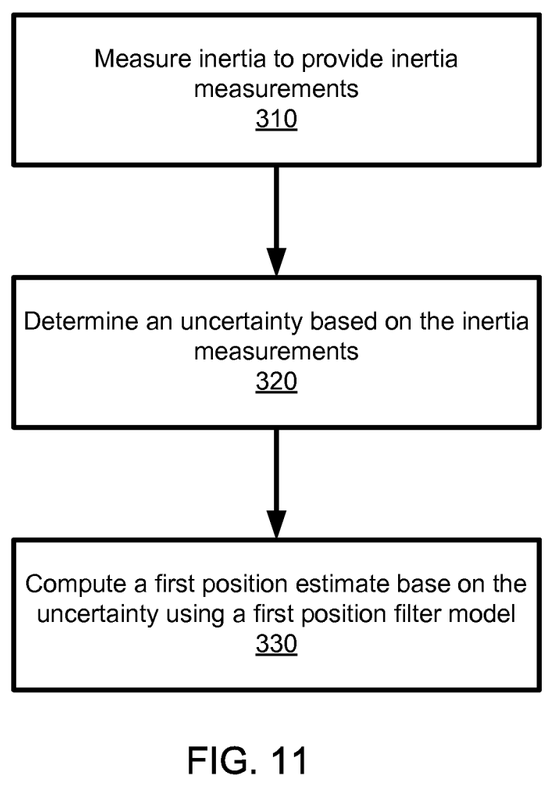
FIG. 11 shows a flow chart of a method to produce a position of a mobile station based on an uncertainty, in accordance with embodiments of the present invention.

FIG. 11 shows a flow chart of a method to produce a position of a mobile station based on an uncertainty, in accordance with embodiments of the present invention. At 310, the inertial sensor 110 measures inertia experienced by the mobile device 100 and provides inertia measurements. The inertial sensor 110 may include an accelerometer and/or a gyrometer and thus provide linear acceleration and/or angular acceleration inertia measurements. At 320, an inertia measurement processor 130 coupled to the inertial sensor 110 accepts the inertia measurements and determines an uncertainty based on the inertia measurements. This uncertainty may be based on a variance of the inertia measurements and may be a multi-channel variance. At 330, a navigation position filter 140 coupled to the inertia measurement processor 130 receives the uncertainty and determines a position estimate based on the uncertainty. The navigation position filter 140 may include a single position filter model or may include multiple position filter models. If the navigation position filter 140 includes multiple position filter models, a best position estimate may be selected based on the uncertainty or the inertia measurements. In addition, a quantizer 148 may be used to convert the uncertainty into a switch control signal.

As described above, many mobile device 100 have a low resolution inertial sensor. These low resolution inertia measurements from the low resolution inertial sensor may be used to generate an uncertainty value and/or to select a positioning filter model. In some embodiments, this uncertainty value is used as a process noise input signal into a Kalman filter or similar filter. In some embodiments, multiple navigation position filter models operate concurrently, each computing a position estimate. In these embodiments, a switch selects one position estimate from the multiple navigation position filter models based on either the uncertainty value or based on another characteristic of the inertia measurements.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A mobile station comprising:
   an inertial sensor, wherein the inertial sensor provides inertia measurements;
   inertia measurement processor coupled to the inertial sensor to accept the inertia measurements and to determine an uncertainty based on the inertia measurements; and
   navigation position filter coupled to the inertia measurement processor to receive the uncertainty and to determine a position estimate based on the uncertainty, wherein the navigation position filter comprises:
     a first position filter model to compute a first position estimate base on the uncertainty,
     a second position filter model to compute a second position estimate based on the uncertainty; and
     a switch coupled to the first position filter and the second position filer and configured to select between the first position estimate and the second position estimate.

2. The mobile station of claim 1, wherein the inertial sensor comprises an accelerometer.

3. The mobile station of claim 1, wherein the inertial sensor comprises an accelerometer having a maximum of 2 bits of resolution per axis.

4. The mobile station of claim 1, wherein the navigation position filter further comprises a quantizer coupled to the inertia measurement processor to receive the uncertainty and coupled to the switch, wherein the quantizer quantizes the uncertainty into a maximum of four values.

5. The mobile station of claim 1, wherein the switch is controlled by a signal based on the uncertainty.

6. The mobile station of claim 1, wherein the switch is controlled by a signal based on the inertia measurements.

7. The mobile station of claim 1, wherein the first position filter model comprises a zero-velocity model.

8. The mobile station of claim 1, wherein the first position filter model comprises a position-velocity (PV) filter.

9. The mobile station of claim 1, wherein the first position filter model comprises a Kalman filter having constant curvature.

10. The mobile station of claim 1, wherein the first position filter model comprises a Kalman filter having constant velocity.

11. The mobile station of claim 1, wherein the inertial sensor comprises a gyrometer.

12. The mobile station of claim 11, wherein the inertial sensor further comprises an accelerometer.

13. The mobile station of claim 1, wherein the inertia measurement processor determines the uncertainty based on a variance of the inertia measurements.

14. The mobile station of claim 13, wherein the variance comprises a multi-channel variance.

15. The mobile station of claim 13, wherein the variance comprises a range between a maximum value of the inertia measurements and a minimum value of the inertia measurements.

16. A method to produce a position of a mobile station, the method comprising:
    measuring inertia using an inertial sensor to provide inertia measurements;
    determining an uncertainty based on the inertia measurements;
    computing a first position estimate base on the uncertainty using a first position filter model and computing a second position estimate based on the uncertainty using a second position filter model; and
    switching to select the position estimate from between:
      the first position estimate from the first position filter model; and
      the second position estimate from the second position filter model.

17. The method of claim 16 wherein the inertia measurements comprise measurements from an accelerometer.

18. The method of claim 16, wherein the inertia measurements comprise measurements from a gyrometer.

19. The method of claim 16, wherein the inertia measurements comprise measurements from an accelerometer having a maximum of 2 bits of resolution per axis.

20. The method of claim 16, wherein the act of determining the uncertainty based on the inertia measurements comprises computing a variance of the inertia measurements.

21. The method of claim 16, wherein the variance comprises a multi-channel variance.

22. The method of claim 16, wherein the variance comprises a range between a maximum value of the inertia measurements and a minimum value of the inertia measurements.

23. The method of claim 16, further comprising quantizing the uncertainty into a maximum of four values.

24. The method of claim 16, wherein the act of switching comprises controlling an output of a switch based on the uncertainty.

25. The method of claim 16, wherein the first position filter model comprises a Kalman filter having constant curvature.

26. The method of claim 16, wherein the first position filter model comprises a Kalman filter having constant velocity.

27. The method of claim 24, wherein the first position filter model comprises a zero-velocity model.

28. The method of claim 24, wherein the first position filter model comprises a position-velocity (PV) filter.

29. A mobile station comprising:
    means for measuring inertia using an inertial sensor to provide inertia measurements;
    means for determining an uncertainty based on the inertia measurements;
    means for computing a first position estimate base on the uncertainty using a first position filter model;
    means for computing a second position estimate based on the uncertainty using a second position filter model; and
    means for switching to select the position estimate from between:
      the first position estimate from the first position filter model; and
      the second position estimate from the second position filter model.

30. A mobile station comprising a processor and memory wherein the memory includes software instructions to:
    measure inertia using an inertial sensor to provide inertia measurements;
    determine an uncertainty based on the inertia measurements; and
    compute a first position estimate base on the uncertainty using a first position filter model and compute a second position estimate based on the uncertainty using a second position filter model; and
    switch to select the position estimate form between:
      the first position estimate from the first position filter model; and
      the second position estimate from the second position filter model.

31. A computer-readable medium including program code stored thereon, comprising program code to:
    measure inertia using an inertial sensor to provide inertia measurements;

determine an uncertainty based on the inertia measurements;

compute a first position estimate base on the uncertainty using a first position filter model and compute a second position estimate based on the uncertainty using a second position filter model; and switch to select the position estimate from between:
  the first position estimate from the first position filter model; and
  the second position estimate from the second position filter model.

32. A mobile station comprising:

an inertial sensor, wherein the inertial sensor provides inertia measurements;

inertia measurement processor coupled to the inertial sensor to accept the inertia measurements and to determine an uncertainty based on the inertia measurements; and navigation position filter coupled to the inertia measurement processor to receive the uncertainty and to determine a position estimate based on the uncertainty, wherein the navigation position filter comprises:
  a first position filter model to compute a first position estimate base on the uncertainty;
  a second position filter model to compute a second position estimate base on the uncertainty; and
  a switch comprising a first input port for the first position estimate,
a second input port for the second position estimate, a control input port coupled to a characteristic of the inertia measurements, and an output port selectable by the control input port.

33. The mobile station of claim 32, wherein the characteristic of the inertia measurements comprises the uncertainty.

* * * * *